United States Patent
Steinborn et al.

(10) Patent No.: US 10,508,724 B2
(45) Date of Patent: Dec. 17, 2019

(54) SHIFT CONTROL METHOD FOR AN AUTOMATED RANGE-CHANGE TRANSMISSION

(71) Applicant: ZF Friedrichshafen AG, Friedrichshafen (DE)

(72) Inventors: Mario Steinborn, Friedrichshafen (DE); Tobias Mayerhofer, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 61 days.

(21) Appl. No.: 15/813,753

(22) Filed: Nov. 15, 2017

(65) Prior Publication Data

US 2018/0142785 A1     May 24, 2018

(30) Foreign Application Priority Data

Nov. 22, 2016   (DE) ........................ 10 2016 223 016

(51) Int. Cl.
*F16H 37/04*     (2006.01)
*F16H 61/70*     (2006.01)
*F16H 61/04*     (2006.01)

(52) U.S. Cl.
CPC ......... *F16H 37/046* (2013.01); *F16H 61/702* (2013.01); *F16H 61/0403* (2013.01); *F16H 2306/48* (2013.01)

(58) Field of Classification Search
CPC .. F16H 61/0403; F16H 61/702; F16H 37/046; F16H 2306/48
See application file for complete search history.

(56) References Cited

U.S. PATENT DOCUMENTS

| 7,077,024 B2* | 7/2006 | Lauri | B60W 10/111 74/325 |
|---|---|---|---|
| 7,121,979 B2* | 10/2006 | Steen | B60W 10/06 477/111 |
| 7,225,073 B2* | 5/2007 | Hedman | B60K 31/047 123/349 |
| 7,662,063 B2* | 2/2010 | Schnitzer | B60W 10/02 477/180 |
| 7,798,937 B2* | 9/2010 | Gitt | F16H 3/0915 475/207 |

(Continued)

FOREIGN PATENT DOCUMENTS

DE    10 2007 055 720 A1    6/2009

*Primary Examiner* — David R Morris
(74) *Attorney, Agent, or Firm* — Davis & Bujold PLLC; Michael J. Bujold (57) ABSTRACT

A method for shift control of an automated auxiliary transmission that is mounted in a drive train of a motor vehicle between a drive motor (AM) and a final drive, and includes at least one multi-step main gearing (HG) and one two-step front-mounted group (VG) connected upstream of the main gearing (HG), and with which the main gearing (HG) can be shifted via unsynchronized clutches and the front-mounted group can be shifted via synchronized clutches. Depending on the currently existing driving or operating situation, a gear change is performed in the auxiliary transmission through a change in the transmission ratio step (G1, G2, G3) of the main gearing (HG) while maintaining the currently engaged transmission ratio step (K1, K2) in the front-mounted group (VG).

8 Claims, 4 Drawing Sheets

(56) References Cited

U.S. PATENT DOCUMENTS

| | | | | |
|---|---|---|---|---|
| 7,878,942 B2* | 2/2011 | Bader | F16H 61/0403 | 477/78 |
| 7,976,431 B2* | 7/2011 | Bader | F16H 37/046 | 475/209 |
| 8,066,606 B2* | 11/2011 | Dittrich | F16H 3/006 | 475/207 |
| 8,066,617 B2* | 11/2011 | Steinborn | B60W 10/06 | 477/15 |
| 8,152,691 B2* | 4/2012 | Miller | F16H 61/702 | 475/209 |
| 8,161,835 B2* | 4/2012 | Borntrager | F16H 37/043 | 475/207 |
| 8,230,752 B2* | 7/2012 | Miller | F16H 37/046 | 74/331 |
| 8,262,538 B2* | 9/2012 | Borntraeger | F16H 3/126 | 477/15 |
| 8,317,656 B2 | 11/2012 | Breuer et al. | | |
| 8,322,251 B2* | 12/2012 | Muller | F16H 3/095 | 475/302 |
| 8,444,528 B2* | 5/2013 | Miller | F16H 37/046 | 477/71 |
| 8,806,975 B2* | 8/2014 | Schneider | B60K 17/28 | 701/22 |
| 8,881,614 B2* | 11/2014 | Becke | B60K 6/547 | 74/325 |
| 8,979,707 B2* | 3/2015 | Kemler | F16H 61/12 | 475/207 |
| 9,068,636 B2* | 6/2015 | Dittrich | F16H 37/042 | |
| 9,239,106 B2* | 1/2016 | Schneider | B60K 17/28 | |
| 9,381,808 B2* | 7/2016 | Sauter | B60K 17/28 | |
| 10,259,462 B2* | 4/2019 | Mair | B60W 30/1888 | |
| 2005/0026747 A1* | 2/2005 | Steen | B60W 10/06 | 477/78 |
| 2005/0085974 A1* | 4/2005 | Hedman | B60K 31/047 | 701/51 |
| 2005/0166693 A1* | 8/2005 | Lauri | B60W 10/111 | 74/325 |
| 2007/0265135 A1* | 11/2007 | Ido | F16H 57/0413 | 477/34 |
| 2007/0288150 A1* | 12/2007 | Schnitzer | B60W 10/02 | 701/51 |
| 2008/0127758 A1* | 6/2008 | Gitt | F16H 3/0915 | 74/329 |
| 2009/0071274 A1* | 3/2009 | Bader | F16H 61/0403 | 74/335 |
| 2009/0071277 A1* | 3/2009 | Bader | F16H 37/046 | 74/336 R |
| 2009/0107289 A1* | 4/2009 | Borntrager | F16H 37/043 | 74/745 |
| 2009/0239704 A1* | 9/2009 | Steinborn | B60W 10/06 | 477/4 |
| 2009/0305833 A1* | 12/2009 | Dittrich | F16H 3/006 | 475/207 |
| 2009/0325763 A1* | 12/2009 | Dittrich | F16H 3/12 | 477/109 |
| 2010/0071491 A1* | 3/2010 | Muller | F16H 3/095 | 74/331 |
| 2010/0105517 A1* | 4/2010 | Borntraeger | F16H 3/126 | 477/3 |
| 2010/0285921 A1* | 11/2010 | Miller | F16H 37/046 | 477/71 |
| 2010/0285922 A1* | 11/2010 | Breuer | B60W 10/06 | 477/115 |
| 2010/0319485 A1* | 12/2010 | Miller | F16H 37/046 | 74/664 |
| 2010/0323845 A1* | 12/2010 | Miller | F16H 61/702 | 477/75 |
| 2011/0072923 A1* | 3/2011 | Dittrich | F16H 37/042 | 74/333 |
| 2011/0219900 A1* | 9/2011 | Schneider | B60K 17/28 | 74/473.1 |
| 2011/0224855 A1* | 9/2011 | Schneider | B60K 17/28 | 701/22 |
| 2012/0178586 A1* | 7/2012 | Kemler | F16H 61/12 | 477/79 |
| 2013/0036848 A1* | 2/2013 | Becke | B60K 6/547 | 74/333 |
| 2015/0039182 A1* | 2/2015 | Sauter | B60K 17/28 | 701/36 |
| 2017/0151953 A1* | 6/2017 | Mair | B60W 10/02 | |
| 2018/0172142 A1* | 6/2018 | Rist | F16H 61/0403 | |

* cited by examiner

SHIFT CONTROL METHOD FOR AN AUTOMATED RANGE-CHANGE TRANSMISSION

This application claims priority from German patent application serial no. 10 2016 223 016.6 filed Nov. 22, 2016.

FIELD OF THE INVENTION

The present invention relates to a process for the shift control of an automated auxiliary transmission that is mounted in a drive train of a motor vehicle between a drive motor and a final drive and comprises at least one multi-stage main gearing and a two-stage front-mounted group upstream of the main gearing. Moreover, the invention relates to a control unit, which is configured for performing the process, and a matching computer program product.

BACKGROUND OF THE INVENTION

Auxiliary transmissions having a multi-stage main gearing and a front-mounted group, upstream thereof on the drive train, and a range group, downstream thereof on the drive train, have been known for some time and are preferably used in commercial vehicles. Due to the front-mounted group, usually having a two-stage design and a small transmission ratio increment, also called a splitter group, the transmission ratio increments between the transmission ratio steps of the main gearing are basically halved, resulting in the overall number of available transmission ratio steps being doubled. The use of a normally two-stage range group significantly increases the spread of the overall transmission, and the overall number of available gear ratio steps is again doubled. As a result, in conjunction with a three-stage main gearing (having three forward gears and one reverse gear), a 12-speed auxiliary transmission is obtained (having a total of twelve forward gears and a maximum of four reverse gears), and in conjunction with a four-stage main gearing (having four forward gears and one reverse gear), a 16-speed auxiliary transmission is obtained (having a total of sixteen forward gears and a maximum of four reverse gears).

The auxiliary transmission has significantly more compact dimensions and a lower weight than a single gear box having a comparable number of gears and similar gear stepping and spread. However, as many gear changes in an auxiliary transmission entail changes of transmission ratio steps in several subtransmissions, making them rather complex, most of the known auxiliary transmissions are designed to be shiftable in either a partially automated or fully automated manner.

A process for operating a drive train of a motor vehicle comprising a motor, a multi-group transmission, and a clutch connected between the motor and the multi-group transmission is known for instance from DE102007055720A1. Quick shifting sequences are achieved herein, in that gears are shifted from an actual gear to a target gear without actuating the engaged clutch.

SUMMARY OF THE INVENTION

Against this background, the present invention addresses the problem of presenting a novel process for shift control of an automated auxiliary transmission, which, in addition to short shifting times, also increases the service life of synchronized clutches of a front-mounted group. In addition, a corresponding control unit and a computer program product for performing the process shall also be provided.

From a process perspective, this problem is solved on the basis of the independent claim in conjunction with its characterizing features. In addition, a control unit and a computer program product are the subject matter of the further independent claims. Advantageous further developments are the subject matter of the dependent claims and of the following description.

According to the invention, a process for shift control of an automated auxiliary transmission is proposed, which is disposed in a drive train of a motor vehicle between a drive motor and an final drive, and comprises at least one multi-stage main gearing and a two-stage front-mounted group upstream of the main gearing, wherein the main gearing can be shifted via unsynchronized clutches and the front-mounted group can be shifted via synchronized clutches. The clutches of the main gearing and the clutches of the front-mounted group are preferably combined in pairs in a common shifting package. An input shaft of the auxiliary transmission is connected to the drive motor via a controllable separating clutch. To implement small transmission ratio increments, a shifting strategy is pursued, in which a gear change is performed in the auxiliary transmission through a change in the transmission ratio step of the front-mounted group or through a change in the transmission ratio step of the front-mounted group and the transmission ratio step of the main gearing. In other words, the gear steps of the auxiliary transmission are shifted sequentially according to this shifting strategy. Starting from an actual gear, the next higher or next lower gear is engaged, in doing so, every shifting operation is accompanied by a change in the transmission ratio step of the front-mounted group of the auxiliary transmission.

The invention thus comprises the technical teachings that, depending on a currently existing driving or operating situation, a gear change is performed in the auxiliary transmission through a change in the transmission ratio step of the main gearing, while maintaining the transmission ratio step currently engaged in the front-mounted group. In other words, depending on a present driving or operating situation, a gear change is performed in the auxiliary transmission such that only the transmission ratio step of the main gearing is changed. Consequently, a harmonious shifting sequence having shifting times of nearly identical length in such a driving or operating situation can be implemented. If a gear change in the auxiliary transmission occurs exclusively through a change in the transmission ratio step of the main gearing, then the shifting times required for the gear change are shorter than with a gear change in which both the transmission ratio step of the main gearing and the transmission ratio step of the front-mounted group are changed.

Moreover, the gears of the front-mounted group are only shifted if this is necessary due to an existing driving or operating situation. As a result, the number of transmission ratio step changes in the front-mounted group is reduced, subjecting the synchronization devices in the front-mounted group to less wear.

Because the synchronized clutches limit the service life of the overall auxiliary transmission due to wear, both the service life of the synchronized clutches as well as the service life of the overall auxiliary transmission can be increased through the process according to the invention.

If the auxiliary transmission also comprises a two-stage range group downstream of the main gearing, which can be shifted, by way of example, via synchronized or unsynchronized clutches comprised in pairs in a collective shifting is package, then a gear shifting in the auxiliary transmission preferably occurs through a change in the transmission ratio step of the main gearing or through a change in the transmission ratio step of the main gearing and the transmission ratio step of the range group. Here as well, a gear changed in the auxiliary transmission, depending on a currently existing driving or operating situation, while maintaining the currently engaged transmission ratio step in the front-mounted group.

According to one variation of the process according to the invention, it is provided that a gear of the auxiliary transmission is changed while maintaining the transmission ratio step engaged in the front-mounted group if a current driving resistance does not fall below a first set threshold and does not exceed a second set threshold.

If the current driving resistance is within the set threshold range, then the motor vehicle can be driven even if a gear change has a larger transmission ratio increment. If the current driving resistance is outside the set threshold range, however, then the transmission ratio step of the front-mounted group is preferably changed during a gear change in the auxiliary transmission, resulting in a smaller transmission ratio increment, during which the motor vehicle can be driven.

Driving resistance is understood herein to be in particular a climbing resistance of the motor vehicle, in which the grade of the current driving surface and the mass of the motor vehicle are taken into account. This can, however, also refer to an overall driving resistance of the motor vehicle, in which, in addition to a climbing resistance, rolling resistance, drag, and acceleration resistance are also taken into account.

The threshold range of the driving resistance can be defined, for example, as a function of a grade of the driving surface. In this manner, the first set threshold of the driving resistance can correspond, for example, to a driving resistance prevalent while driving on a slight slope, while the second set threshold of the driving resistance can correspond, for example, to a driving resistance prevalent when driving on a steeper incline. When driving on a level or only slightly inclined slope, the current driving resistance lies within the set threshold range of the driving resistance, even if the motor vehicle is fully loaded, wherein gear changes in the auxiliary transmission can consequently be performed without actuating the front-mounted group.

Another design provides that a gear of the auxiliary transmission is changed without changing a transmission ratio step in the front-mounted group if a current vehicle speed lies within a predetermined speed range. It can thus be provided, for example, that gears are changed without the actuation of the front-mounted group if the vehicle speed lies within a range of 20 km/h to 70 km/h. On the other hand, in a lower speed range, in which the motor vehicle is also started, as well as in a higher speed range, in which the vehicle speed reaches a setpoint speed of 80 km/h, for example, a gear of the auxiliary transmission is changed with an actuation of the front-mounted group, thus resulting in small transmission ratio increments.

In addition, the process according to the invention may provide for a gear of the auxiliary transmission to be changed while maintaining the transmission ratio step engaged in the front-mounted group if a current driver input in the form of an actuation of the accelerator pedal exceeds a set threshold of the accelerator pedal actuation. A gear of the auxiliary transmission may thus be changed if the accelerator pedal is actuated, for example, in a range between 20% and 100% of the maximum possible accelerator pedal actuation, without changing the transmission ratio step engaged in the front-mounted group. If, on the other hand, the accelerator pedal is pressed down in a range between 0% and 20% of the maximum possible accelerator pedal actuation, then the transmission ratio step of the front-mounted group is also changed if there is a gear change in the auxiliary transmission, resulting in a gear change with a small transmission ratio increment. This is advantageous in a driving situation in which the driver input is aimed at a slower vehicle acceleration.

In particular in cold conditions, the drag torque of the auxiliary transmission increases significantly. If, in such an operating situation, the transmission ratio step of the front-mounted group is changed during a gear change in the auxiliary transmission, then the synchronization devices of the clutch of the front-mounted group are strained and the clutch is subjected to heavy wear and tear. For this reason, in another variation of the process according to the invention permits a gear of the auxiliary transmission to be changed while maintaining the transmission ratio step engaged in the front-mounted group, if a current transmission temperature or a current ambient temperature is lower than a defined threshold.

A further embodiment of the process according to invention provides that projection data are taken into account for the decision of whether a gear of the auxiliary transmission is changed while maintaining the transmission ratio step engaged in the front-mounted group. Gear shifting sequences for the auxiliary transmission are preferably determined in advance using the projection data, wherein gear shifting sequences that take place without an actuation of the front-mounted group are given preference.

It may be provided in the scope of one possible embodiment variation that, for example, the height, slope and/or incline of the driving surface, or the respective type of roadway are detected in the form of future route data. The detection thereof can preferably take place via a navigation device coupled to a transmission control unit, or via another navigation system. Other detection options can also be used in order to obtain appropriate data regarding the driving route in front of the vehicle, e.g. sensors or cameras.

If it is determined by means of the data of the upcoming route that the vehicle is no longer located on a street, but instead is being driven off-road, or that the vehicle is on a steep incline or directly in front of a roundabout or a tight turn, then a shifting strategy is used, in which a gear of the auxiliary transmission is changed with an actuation of the front-mounted group, because small transmission ratio increments are advantageous in these situations.

The process for the shift control of an auxiliary transmission described above can be used to compute and implement individual gear changes of the auxiliary transmission, or gear shifting sequences in which numerous gear changes take place successively.

The invention also relates to a control device that is configured for performing the process according to the invention. The control device comprises means for performing the process according to the invention. These means are both hardware and software. The hardware means are data interfaces, to exchange data with the components of the drive train involved in the execution of the process according to the invention. The hardware means of the control device furthermore are a processor for data processing, and optionally, a memory for data storage. The software means are program modules for performing the process according to the invention.

The solution according to the invention can also be embodied in the form of a computer program product, which, if running on a processor of a control device, instructs the processor in the manner of software to execute the process steps assigned thereto that are the subject matter of the invention. In this context, a computer-readable medium is also part of the subject matter of the invention, on which a computer program product as described above is stored in an accessible form.

The invention is not limited to the given combination of features of the coordinate independent claims or the claims dependent thereon. Further options result for combining the individual features, insofar as they arise from the claims, from the following description of exemplary embodiments or directly from the drawings. The references to the drawings in the claims using reference symbols shall not limit the scope of protection of the claims.

BRIEF DESCRIPTION OF THE DRAWINGS

For purposes of clarification of the invention, the description is accompanied by drawings showing exemplary embodiments. Therein.

DETAILED DESCRIPTION OF THE PREFERRED EMBODIMENTS

Figure 1:
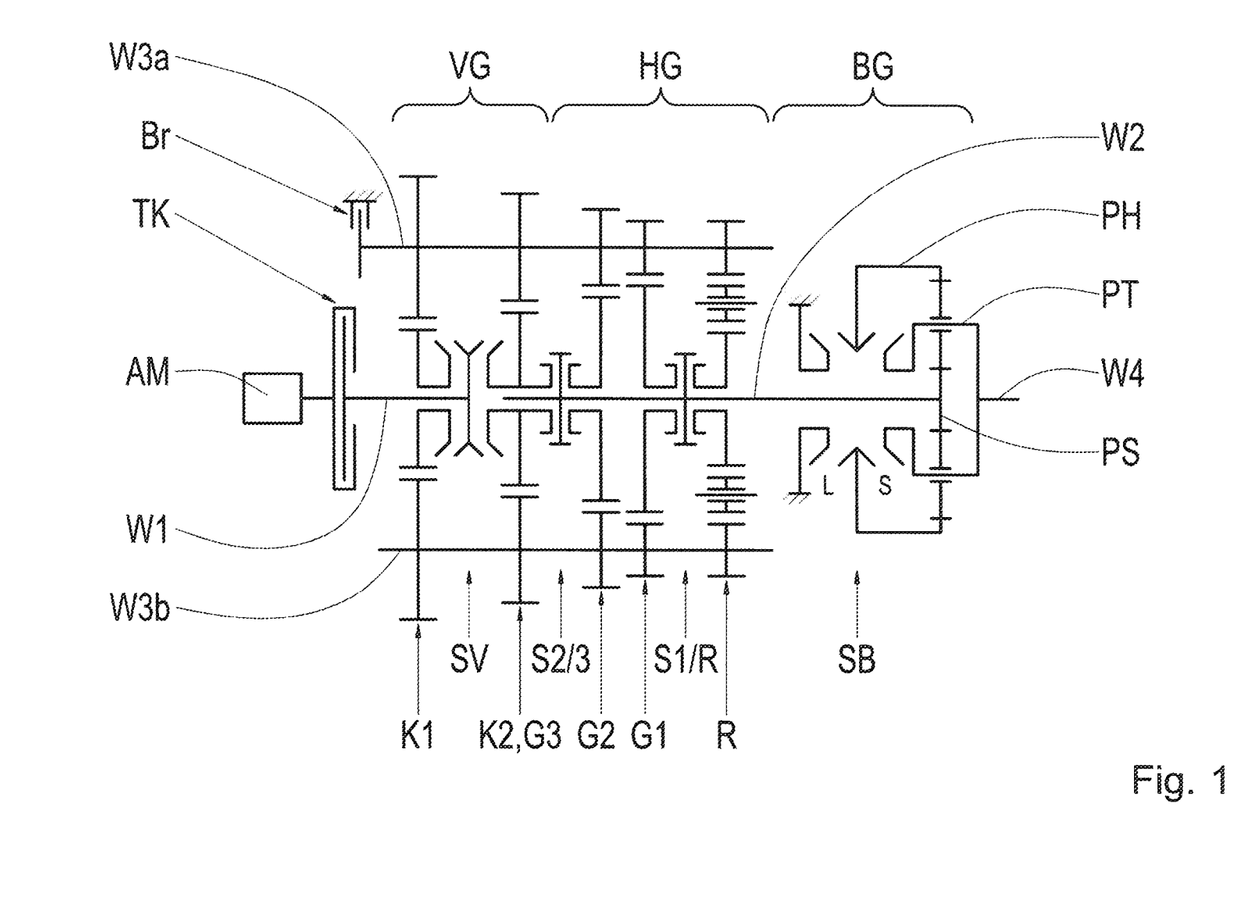
FIG. 1 shows a schematic design of an automated auxiliary transmission having a three-stage main gearing.

The auxiliary transmission depicted in FIG. 1 comprises a three-stage main gearing HG, a front-mounted group, or splitter group VG connected upstream of the main gearing HG on the drive train, and a range group BG downstream of the main gearing HG. The main gearing HG of the auxiliary transmission is configured here as a direct gear transmission in a countershaft design and has a main shaft W2 and two countershafts W3a and W3b, wherein the first countershaft W3a is equipped with a controllable transmission brake Br.

The main gearing HG has a three-step configuration, with three transmission ratio steps G1, G2, G3 for forward driving and one transmission ratio step R for driving in reverse. Idler gears of the transmission ratio steps G1, G2 and R are each rotatably supported on the main shaft W2, and can be shifted via dedicated clutches. The dedicated fixed gears are arranged on the countershafts W3a and W3b in a rotationally fixed manner.

The highest transmission ratio step G3 of the main gearing HG, configured as a direct gear, can be shifted via a direct clutch SV. The clutches of the transmission ratio steps G3 and G2 and the clutches of the transmission ratio steps G1 and R are each combined to form a collective shifting package S2/3, and S1/R, respectively. The main gearing HG is designed to be shifted in an unsynchronized manner.

The front-mounted group VG of the auxiliary transmission has a two-step design, and is likewise formed based on a countershaft design, wherein the two transmission ratio steps K1, K2 of the front-mounted group VG form two shiftable input constants of the main gearing HG. Because of a lower transmission ratio difference between the two transmission ratio steps K1, K2, the front-mounted group VG is configured as a splitter group. The idler gear of the first transmission step K1 is rotatably supported on the input shaft W1, which is connected via a controllable separating clutch TK to a drive motor AM, configured as an internal combustion engine or electric motor, for example.

The idler gear of the second transmission ratio step K2 is rotatably supported on the main shaft W2. The fixed gears of both transmission ratio steps K1, K2 of the front-mounted group VG are each arranged in a rotationally fixed manner on the countershafts W3a and W3b, extended at the input side, of the main gearing HG. The synchronized clutches of the front-mounted group VG are combined to form a collective shifting package SV.

The range group BG of the auxiliary transmission disposed downstream of the main gearing HG likewise has a two-step configuration, but in a planetary design, having a single planetary gearset. The sun gear PS is connected in a rotationally fixed manner to the main shaft W2, extended at the output side, of the main gearing HG. The planet carrier PT is coupled in a rotationally fixed manner to the output shaft W4 of the auxiliary transmission. The ring gear PH is connected to a shifting package SB having two synchronized clutches, through which the range group BG can be shifted alternately to a slow driving stage L by connecting the ring gear PH to a stationary housing part and to a fast driving stage S by connecting the ring gear PH to the planet carrier PT. The range group BG is configured such that it can be shifted in a synchronized manner.

To this end, an actuation of the clutches present in the auxiliary transmission for setting a desired transmission ratio step (K1, K2, G3, G2, G1, R, L, S) is controlled or regulated via a control device of the auxiliary transmission. The control device can preferably be configured as a transmission control unit.

The process according to the invention for shift control of the automated auxiliary transmission now provides that for a detected, previously determined driving or operating situation, a gear is changed in the auxiliary transmission through an actuation of a shifting package S1/R, S2/3 of the main gearing HG, or through an actuation of a shifting package S1/R, S2/3 of the main gearing HG and the shifting package SB of the range group BG, while the gear step engaged in the front-mounted group VG remains unchanged.

Figure 2:
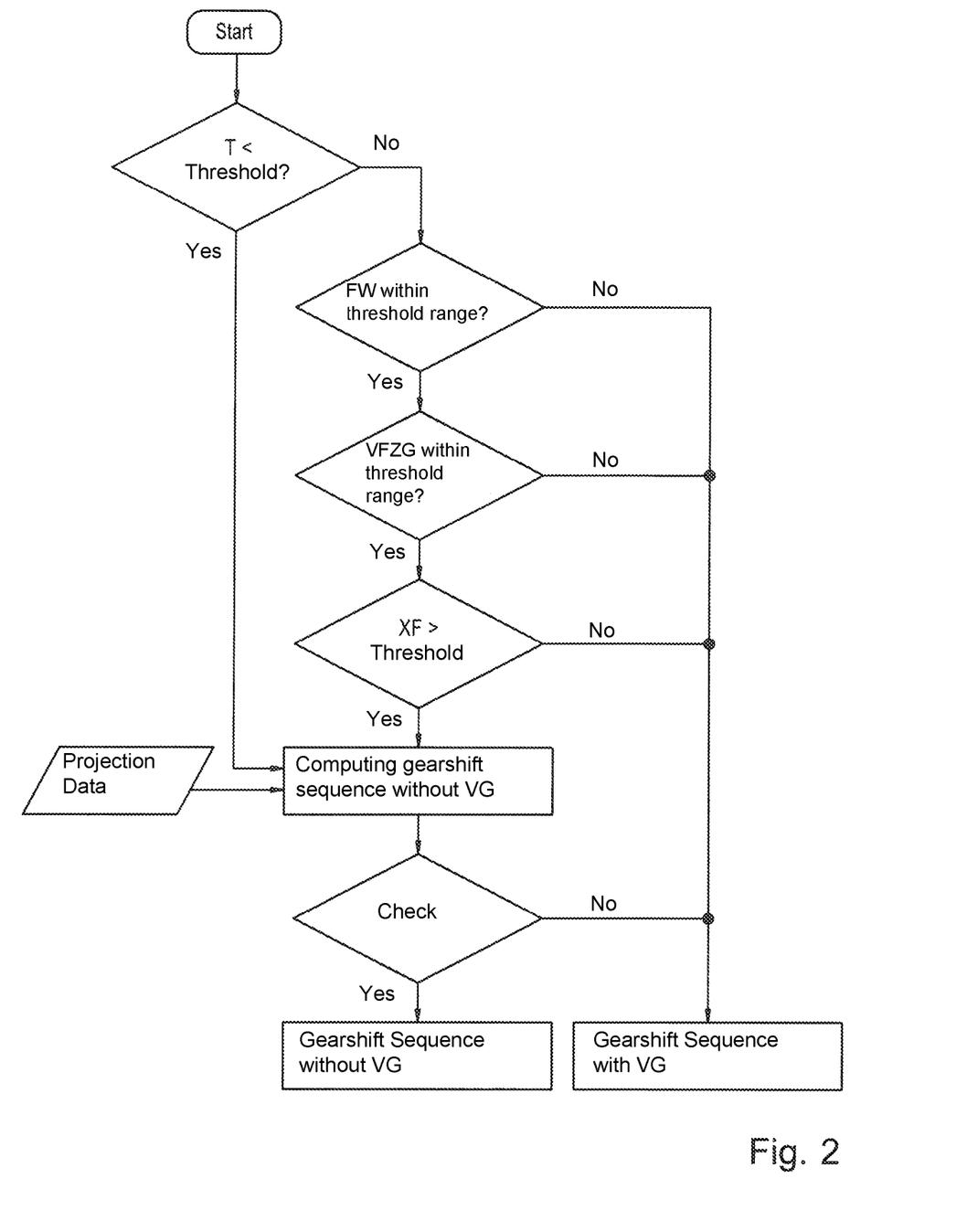
FIG. 2 shows a flow chart of a process according to the invention for the shift control of the automated auxiliary transmission of FIG. 1.

An embodiment of the process according to the invention shall now be explained in greater detail with reference to FIG. 2. In a first process step at the start of the process, it is checked whether a current transmission fluid temperature T is lower than a previously defined temperature threshold. If this condition is fulfilled, the process branches to a function module in which a gear shifting sequence of the auxiliary transmission is computed, for which the front-mounted group is not actuated. The received projection data are also taken in to account in this function module in the determination of the gear shifting sequence.

Then, once a gear shifting sequence without actuation of the front-mounted group has been computed, a further process step is accessed, in which it is checked whether the drivability of the motor vehicle is ensured upon the implementation of the computed gear shifting sequence, and the gear shifting sequence corresponds to an existing driver input. It is also ensured that upon the implementation of the computed gear shifting sequence, a respective setpoint gear can be engaged without decelerating the motor vehicle too strongly, or bringing it to a stop, and without startling the vehicle driver if the computed gear shifting sequence is implemented. If the drivability of the motor vehicle is ensured and the computed gear shifting sequence corresponds to the driver input, the computed gear shifting sequence, in which there is no transmission ratio change in the front-mounted group, is then performed. Thus, for this gear shifting sequence, a transmission ratio change is only performed in the main gearing or in the main gearing and in the range group. Conversely, if the drivability of the motor vehicle is not ensured, or the computed gear shifting sequence does not correspond to the driver input, the process proceeds to a function module in which a gear shifting sequence, in which both the front-mounted group as well as the main gearing and the range group can be actuated, is computed. Because the front-mounted group is also taken into account in the computation of the gear shifting sequence, a gear shifting sequence can be computed in which a gear directly following the current actual gear can be engaged. The computed gear shifting sequence can subsequently be used for the shift control of the auxiliary transmission.

If, on the other hand, it has been determined at the start of the process that the current transmission fluid temperature T is higher than the previously defined temperature threshold, then a function module is accessed, in which it is checked whether a current driving resistance FW does not fall below a first set threshold and does not exceed a second set threshold. If the current driving resistance lies within the determined threshold range, then a function module is accessed, in which it is checked whether a current driving speed $V_{FZG}$ lies within a predetermined speed range. If the current vehicle speed lies within the determined speed range, then a function module is accessed, in which it is checked whether a current driver input XF in the form of an accelerator pedal actuation exceeds a set threshold. If an accelerator pedal actuation is detected that exceeds the set threshold, then a function module is accessed, in which the gear shifting sequence of the auxiliary transmission, in which the front-mounted group is not actuated, is computed.

Subsequently it is checked whether the motor vehicle can be driven if the computed gear shifting sequence is implemented, and the gear shifting sequence corresponds to an existing driver input. On this basis, the gear shifting sequence is either performed, or a new gear shifting sequence is computed, taking into account a transmission ratio change in the front-mounted group, which is subsequently performed.

If, in contrast, the current driving resistance is not within the determined limit range, the current vehicle speed is not within the predetermined speed range, or the current driver input does not exceed a set threshold, then the process proceeds to a function module in which a gear shifting sequence of the auxiliary transmission is computed, taking into account all of the existing groups.

The transmission ratio step engaged in the front-mounted group is thus only changed if this is necessary due to an existing driving or operating situation. As a result, the number of transmission ratio step changes in the front-mounted group can be reduced, wherein the synchronization devices of the front-mounted group are worn to a lesser extent.

Figure 3:
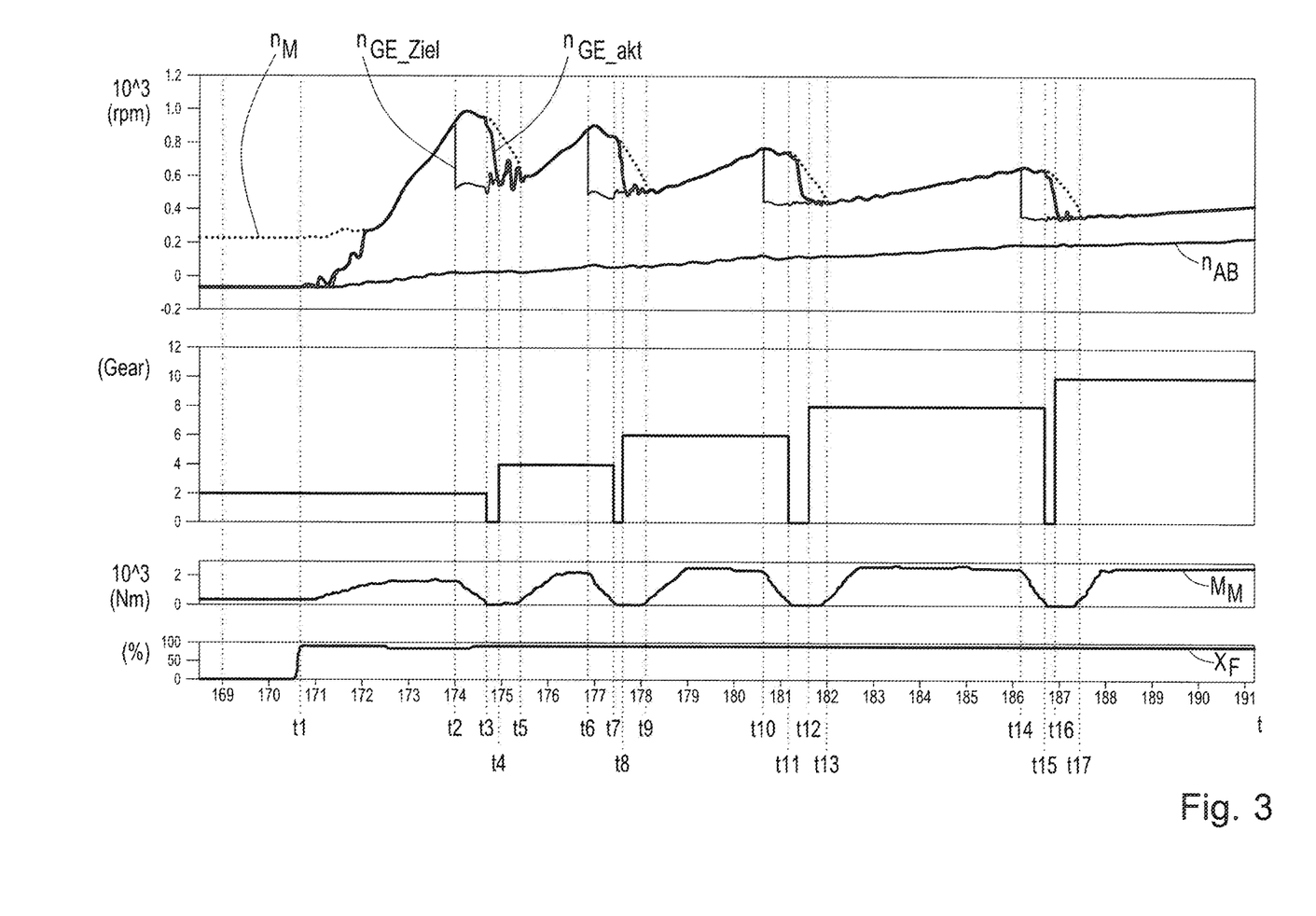
FIG. 3 shows a diagram, in which various characteristic curves are plotted as a function of time.

FIG. 3 shows a diagram in which various characteristic curves are plotted as a function of time t, which are obtained when a gear shifting sequence is predetermined by the control device, without actuation of the front-mounted group of the auxiliary transmission. Thus, a motor speed $n_M$, a current transmission input speed $n_{GE\_akt}$, a transmission input target speed $n_{GE\_Ziel}$, and an output speed $n_{AB}$ are plotted in the upper part of FIG. 3. A gear shifting sequence in accordance with the process according to the invention for a shift control of the auxiliary transmission and a characteristic curve of a motor torque $M_M$ and an accelerator pedal setting XF are plotted below this.

At the start of the process, the second gear is engaged in the auxiliary transmission. At a point in time, $t_1$, the accelerator pedal is actuated by a driver to a value of approximately 90% of the maximum accelerator pedal travel, resulting in a corresponding increase in the motor speed $n_M$, the transmission input speed $n_{GE\_akt}$, and the motor torque $M_M$ in the interval between $t_1$ and $t_2$. At time t2, a changing speed is reached, and as a result, an upshift from the second speed to the fourth speed is performed. In doing so, at time $t_2$, a new target speed $n_{GE\_Ziel}$ is determined for the transmission input, and the power of the drive motor is reduced. At time $t_3$, the actual transmission ratio step G1 is disengaged in the main gearing, and the separating clutch TK is disengaged. The input shaft of the auxiliary transmission is subsequently synchronized to the target speed $n_{GE\_Ziel}$ through an actuation of the transmission brake, and the drive motor is adjusted to the target speed of the input shaft. At time $t_4$, the target transmission ratio step G2 is engaged in the main gearing. Subsequently, the separating clutch TK is re-engaged, and the power of the drive motor is increased. When the transmission is upshifted from second to fourth gear, only a change of the transmission ratio step of the main gearing occurs, while the transmission ratio step of the front-mounted group and the transmission ratio step of the range group are not changed.

The shifting sequence described above is repeated for upshifting from fourth gear to sixth gear and from eighth gear to tenth gear, wherein the actual transmission ratio step G2 is disengaged in the main gearing at time $t_7$, and the target transmission ratio step G3 is engaged at time $t_8$, and the actual transmission ratio step G1 is disengaged at time $t_{15}$, and the target transmission ratio step G2 is engaged at time $t_{16}$. The sixth gear is configured as a direct gear. Thus, when upshifting from fourth gear to sixth gear and from eighth gear to tenth gear, only one transmission ratio step of the main gearing is changed, while the transmission ratio step of the front-mounted group and the transmission ratio step of the range group are not changed.

The gear changes described above can thus be performed at nearly identical shifting times.

When upshifting from sixth gear to eighth gear, which occurs at time $t_{10}$ to $t_{13}$, in contrast, the transmission ratio steps of the range group are also changed, in addition to the transmission ratio step of the main gearing. Only the transmission ratio step of the front-mounted group is maintained. It can be seen from the characteristic curves of the gear shifting sequences that the shifting times for performing the gear change take proportionally longer when transmission ratio steps are changed in two groups of the auxiliary transmission for a gear change.

Figure 4:
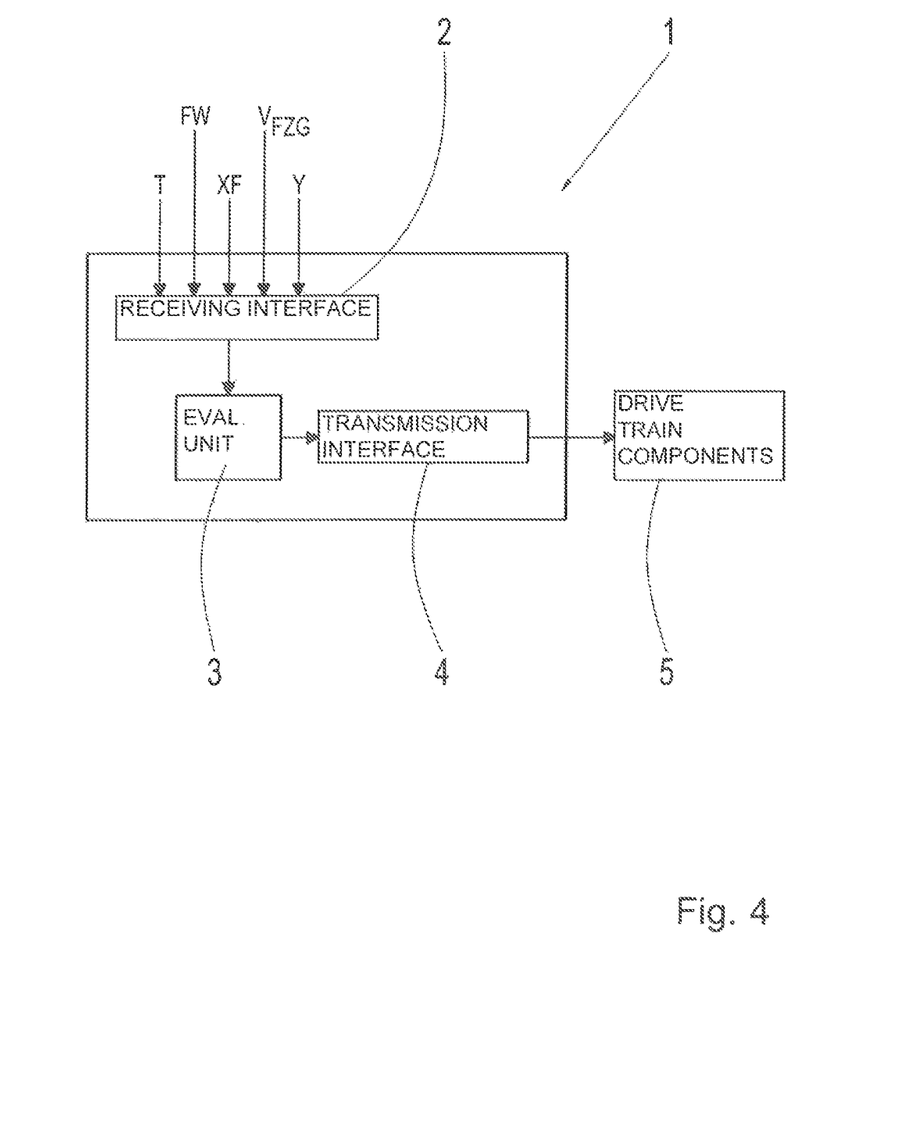
FIG. 4 shows a schematic block diagram of a control device for performing the process according to the invention.

FIG. 4 shows a block diagram of a control device 1, which is configured for performing the process described above. For this purpose, the control device 1 has at least one receiving interface 2, which is configured for receiving at least one signal T, which indicates the transmission fluid temperature, or from which the transmission fluid temperature can be determined, one signal FW, which indicates the current driving resistance, or from which the current driving resistance can be determined, one signal $V_{FZG}$, which indicates the vehicle speed, or from which the vehicle speed can be determined, one signal XF, which indicates the driver input, or from which the driver input can be determined, and signals Y corresponding to projection data.

The transmission fluid temperature T can be determined, for example, by means of a temperature sensor, while the driver input FW can be determined via position or movement sensors disposed on the accelerator pedal.

The control device 1 also has an evaluation unit 3, for evaluating the received input signals, and the data of the received input signals, respectively. Based on the received input signals, or the data of the received input signals, the control device 1 first determines a currently existing driving or operating situation. Depending on the determined driving or operating situation, the control device 1 subsequently determines whether a gear change in the auxiliary transmission is acceptable while maintaining the transmission ration step currently engaged in the front-mounted group. If it is possible to for a gear change to take place in the auxiliary transmission while maintaining the transmission ratio step currently engaged in the front-mounted group, then the gear change in the auxiliary transmission is performed without actuation of the shifting elements in the front-mounted group. For this purpose, the control device 1 transmits control signals to drive train components 5 via a transmission interface 4, in order to engage transmission ratio steps of the auxiliary transmission that are necessary for the implementation of the setpoint gear.

The control device 1 can be designed, by way of example, as a central control unit or as a transmission control unit. The aforementioned signals are only to be regarded as exemplary, and not in a manner limiting to the invention. The detected input signals and the transmitted control signals can be transmitted via a vehicle bus, e.g. via a CAN bus.

REFERENCE SYMBOLS

AM drive motor
TK separating clutch
VG front-mounted group, splitter group
SV shifting package (VG), direct clutch
K1 (first) transmission ratio step (VG)
K2 (second) transmission ratio step (VG)
HG main gearing
G1 (first) transmission ratio step (HG)
G2 (second) transmission ratio step (HG)
G3 (third) transmission ratio step (HG)
R reverse transmission ratio step (HG)
S1/R shifting package (HG)
S2/3 shifting package (HG)
BG range group
SB shifting package (BG)
L slow driving stage (BG)
S fast driving stage (BG)
PH ring gear (BG)
PS sun gear (BG)
PT planet carrier (BG)
W1 input shaft
W2 main shaft
W3a countershaft
W3b countershaft
W4 output shaft
1 control device
2 receiving interface
3 evaluation unit
4 transmitter interface
5 drive train components

The invention claimed is:

1. A method for shift control of an automated auxiliary transmission, which is mounted in a drive train of a motor vehicle between a drive motor and a final drive and comprises at least one multi-step main gearing and one two-step front-mounted group upstream of the main gearing, and in which the main gearing is shiftable via unsynchronized clutches and the front-mounted group is shiftable via synchronized clutches, the method comprising:
    determining either a current transmission fluid temperature or a current ambient temperature;
    comparing the determined current transmission fluid temperature or the current ambient temperature to a defined threshold;
    if the determined current transmission fluid temperature or the determined current ambient temperature is lower than the defined threshold, changing a gear in the auxiliary transmission by changing a transmission ratio step of the main gearing while maintaining a currently engaged transmission ratio step in the front-mounted group;
    if the determined current transmission fluid temperature or the determined current ambient temperature is higher than the defined threshold, determining a current driving resistance of the motor vehicle;
    comparing the current driving resistance to first and second set thresholds; and
    if the current driving resistance does not fall below the first set threshold and does not exceed the second set threshold, performing a gear change of the auxiliary transmission by changing the transmission ratio step of the main gearing while maintaining the currently engaged transmission ratio step in the front-mounted group.

2. The method according to claim 1, wherein the auxiliary transmission has a two-step range group connected downstream of the main gearing, and the method further comprising, depending on an assessment of a currently existing driving or operating situation, changing the gear in the auxiliary transmission either by changing the transmission ratio step of the main gearing or by changing the transmission ratio step of the main gearing and changing a transmission ratio step of the range group while maintaining the currently engaged transmission ratio step engaged in the front-mounted group.

3. The method according to claim 1, further comprising:
    determining a current vehicle speed;
    comparing the current vehicle speed to a predetermined speed range; and
    if the current vehicle speed lies within the predetermined speed range, performing the gear change of the auxiliary transmission by changing the transmission ratio step of the main gearing while maintaining the transmission ratio step engaged in the front-mounted group.

4. The method according to claim 1, further comprising:
    determining a current driver input in a form of an accelerator pedal actuation;
    comparing the current driver input to a further set threshold; and
    if the current driver input exceeds the further set threshold, performing the gear change of the auxiliary transmission by changing the transmission ratio step of the main gearing while maintaining the transmission ratio step engaged in the front-mounted group.

5. The method according to claim 1, further comprising: if the determined current transmission fluid temperature or the determined current ambient temperature is lower than the defined threshold, considering projection data for a decision of whether a gear change of the auxiliary transmission is to be performed while maintaining the transmission ratio step engaged in the front-mounted group, the projection data comprising route data of a driving route in front of the motor vehicle.

6. A control device for shift control of an auxiliary transmission of a motor vehicle, the control device comprising at least one receiving interface, which is configured to receive either a transmission temperature signal or an ambient temperature signal from a temperature sensor, and to receive input signals from drive train components, an evaluation unit, which is configured for determining a current transmission temperature or a current ambient temperature and comparing the current transmission temperature or the current ambient temperature to a defined threshold, and evaluating the received input signals or information of the received input signals, and a transmitter interface, for transmitting control signals to the drive train components, the control device being configured to activate shifting elements of individual groups of the auxiliary transmission to change a gear in the auxiliary transmission by changing a transmission ratio step of a multi-step main gearing while maintaining a currently engaged transmission ratio step in a two-step front-mounted group, if the current transmission fluid temperature signal or the current ambient temperature is lower than the defined threshold, and, the control device being configured to perform a gear change in the auxiliary transmission, while maintaining the currently engaged transmission ratio step in the two-step front-mounted group if the current transmission fluid temperature signal or the current ambient temperature is higher than the defined threshold and if a current driving resistance of the motor vehicle does not fall below a first set threshold and does not exceed a second set threshold.

7. The control device according to claim 6, wherein the automated auxiliary transmission is mounted in a drive train of the motor vehicle between a drive motor and a final drive and comprises the main gearing and the two-step front-mounted group upstream of the main gearing, and in which the main gearing is shiftable, via unsynchronized clutches, and the two-step front-mounted group is shiftable, via synchronized clutches, and depending on a currently existing driving or operating situation, a gear in the auxiliary transmission is changed by changing a transmission ratio step of the main gearing while maintaining the currently engaged transmission ratio step in the two-step front-mounted group.

8. A computer program product, stored on a computer-readable data medium, for performing a method of shift control of an automated auxiliary transmission, which is mounted in a drive train of a motor vehicle between a drive motor and a final drive and comprises at least one multi-step main gearing and one two-step front-mounted group upstream of the main gearing, and in which the main gearing is shiftable, via unsynchronized clutches, and the front-mounted group is shiftable, via synchronized clutches, the method including, determining either a current transmission fluid temperature or a current ambient temperature, comparing the determined current transmission fluid temperature or the current ambient temperature to a defined threshold, and if the determined current transmission fluid temperature or the determined current ambient temperature is lower than the defined threshold, changing a gear in the auxiliary transmission by changing a transmission ratio step of the main gearing while maintaining a currently engaged transmission ratio step in the front-mounted group, and if the determined current transmission fluid temperature or the determined current ambient temperature is higher that the defined threshold, determining a current driving resistance of the motor vehicle, comparing the current driving resistance to first and second set thresholds; and if the current driving resistance does not fall below the first set threshold and does not exceed the second set threshold, performing a gear change of the auxiliary transmission by changing the transmission ratio step of the main gearing while maintaining the currently engaged transmission ratio step in the front-mounted group, the computer program product being executed on a control device for the shift control of the auxiliary transmission of the motor vehicle, the control device having at least one receiving interface, which is configured to receive signals from drive train components, an evaluation unit, which is configured for evaluating the received input signals, or information of the received input signals, and a transmitter interface, for transmitting control signals to the drive train components, the control device being configured to activate shifting elements of individual groups of the auxiliary transmission to change the gear in the auxiliary transmission according to the method.

* * * * *